United States Patent
Tse et al.

(10) Patent No.: US 7,711,116 B2
(45) Date of Patent: May 4, 2010

(54) METHODS AND SYSTEMS FOR TRANSMITTING DIGITAL MESSAGES

(75) Inventors: Chi-Kong Tse, Hong Kong (CN); Chung-Ming Lau, Hong Kong (CN)

(73) Assignee: The Hong Kong Polytechnic University, Hong Kong (CN)

( * ) Notice: Subject to any disclaimer, the term of this patent is extended or adjusted under 35 U.S.C. 154(b) by 1523 days.

(21) Appl. No.: 10/614,260

(22) Filed: Jul. 8, 2003

(65) Prior Publication Data
US 2005/0021308 A1   Jan. 27, 2005

(51) Int. Cl.
 *H04L 9/00* (2006.01)
(52) U.S. Cl. ...................................................... 380/263
(58) Field of Classification Search ................... 380/263
See application file for complete search history.

(56) References Cited

U.S. PATENT DOCUMENTS

| | | | |
|---|---|---|---|
| 5,291,555 A | 3/1994 | Cuomo et al. | |
| 5,857,165 A | 1/1999 | Corron et al. | |
| 5,923,760 A | 7/1999 | Abarbanel et al. | |
| 5,930,364 A | 7/1999 | Kim | |
| 6,049,614 A | 4/2000 | Kim | |
| 6,212,239 B1 | 4/2001 | Hayes | |
| 6,216,093 B1 | 4/2001 | Corron et al. | |
| 6,363,153 B1 | 3/2002 | Parker et al. | |
| 6,661,831 B1 * | 12/2003 | Umeno | 375/142 |
| 6,792,111 B1 * | 9/2004 | Italia et al. | 380/263 |

OTHER PUBLICATIONS

Cong (Ling Cong and Sun Songgeng, "Chaotic Frequency Hopping Sequences", IEEE Transacions on communication s, vol. 46, No. 11, Nov. 1998).*
IEEE (Andrey Kisel, Herve Dedieu and Thomas Schimming, "Maximum Likelihood Approaches for Noncoherent Communications with Chaotic Carriers", IEEE Transactions on Circuits and Systems—I: Fundamental Theory and Applications, vol. 48, No. 5, May 2001).*

(Continued)

*Primary Examiner*—Michael J Simitoski
*Assistant Examiner*—Peter Poltorak
(74) *Attorney, Agent, or Firm*—Schwabe, Williamson & Wyatt, P.C.

(57) ABSTRACT

Digital communication schemes using chaotic signals as carriers can be broadly classified into two categories. In the first category, the chaotic signals carrying the information have to be synchronously regenerated at the receiver, which may be applicable to low noise environment. The second category requires no synchronous regeneration of the carrying chaotic signals in the receiver. An example of the second category utilizes a specific bit structure, which may not be able to resist unintended reception because the fabricated bit structure can be relatively easily detected. This invention involves systems and methods for transmitting digital messages modulated as chaotic signals, and the demodulation methods. One individual chaotic signal generator having a specific chaotic characteristic value is responsible for generating a chaotic signal for each possible value of the digital message according to a chaotic algorithm. The chaotic signal is then transmitted to the receiver, which stores all of chaotic characteristic values and a decoding algorithm. The chaotic signal received at the receiver is then demodulated by evaluating it chaotic characteristic value and matching with the stored chaotic characteristic values.

16 Claims, 5 Drawing Sheets

OTHER PUBLICATIONS

Menezes et al. (Alfred J. Menezes, Paul C. van Oorschot, Scott A. Vanstone, "Handbook of applied cryptography", 1997, ISBN: 0849385237), p. 229.*

Herve Dedieu, "Chaos Shift Keying: Modulation and Demodulation of a Chaotic Carrier Using Self-Synchornizign Chua's Circuits", IEEE Transactions on Circuits and System- II Analog and Digital Signal Processing, vol. 40, No. 10, Oct. 1993.*

Geza Kolumban et al., Differential Chaos Shift Keying: A Robust Coding for Chaos Communication, International Workshop on Nonlinear Dynamics of Electronic Systems, 1996, pp. 87-92.

* cited by examiner

METHODS AND SYSTEMS FOR TRANSMITTING DIGITAL MESSAGES

FIELD OF THE INVENTION

This invention relates to methods and systems for transmitting digital messages modulated by chaotic signals.

BACKGROUND OF THE INVENTION

Chaotic signals are random-like signals generated by deterministic processes. The wideband nature of chaotic signals makes them naturally suitable for carrying information in a spread-spectrum communication system environment, and has the advantages of providing an improved capability of anti-jamming, a lowered probability of interception, and an increased resistance to multi-path effects. Furthermore, because of the random-like nature of chaotic signals, their use in communication offers a basic capability of resistance to detection by unintended receivers. Further, chaotic signals offer intrinsic security because of their random-like nature.

Digital communication schemes using chaotic signals as carriers can be broadly classified into two categories. In the first category, the chaotic signals carrying the information have to be synchronously regenerated at the receiver. The recovery of the information thus relies on a process that achieves synchronization of two chaotic signals or systems. There are numerous ways to achieve synchronization, and some specific methods have been disclosed in U.S. Pat. No. 6,363,153 to Parker, et al., U.S. Pat. No. 6,216,093 to Corron, et al., U.S. Pat. No. 6,212,239 to Hayes, U.S. Pat. No. 6,049,614 to Kim, U.S. Pat. No. 5,930,364 to Kim, U.S. Pat. No. 5,923,760 to Abarbanel, et al., and U.S. Pat. No. 5,291,555 to Cuomo, et al. However, methods requiring regeneration of synchronized chaotic signals at the receiver or synchronization of chaotic signals are applicable only in communication systems where the level of additive noise is low, which may not be applicable to a practical environment.

In the second category, no synchronous regeneration of the carrying chaotic signals is required in the receiver. In order to demodulate the received signal, the receiver may rely on a specific structure of each bit which has been configured by the transmitter to facilitate demodulation. A widely known method of this kind is the differential chaos shift keying method, as described in the original paper by Kolumban, et al. in 1996 ("Differential chaos shift keying: a robust coding for chaos communication" published in the Proceedings of 1996 International Workshop on Nonlinear Dynamics of Electronic Systems, pp. 97-92.) However, such a method makes no use of the chaotic properties of the signals and may not be able to resist unintended reception because the fabricated bit structure can be relatively easily detected.

The properties of chaotic signals generated from deterministic processes depend on the types of chaotic signals and the parameters that are used to generate them. Therefore, it is conceptually possible to make use of the built-in properties of chaotic signals for communication. A prior disclosure that exploits built-in properties of chaotic systems is described in U.S. Pat. No. 5,857,165 issued to Corron, et al. However, the method of Corron, et al., as disclosed in U.S. Pat. No. 5,857,165, does not employ any built-in property as a signature for identifying chaotic signals, but makes use of a parameter to achieve synchronization. In this sense, the method by Corron, et al. as disclosed in U.S. Pat. No. 5,857,165 should be considered as a method under the first category.

In brief, current methods relying on synchronizing the generation of chaotic signals between the transmitter and the receiver may not be practicable due to noise addition. However, methods utilizing no synchronization make the transmission vulnerable to interception.

OBJECT OF THE INVENTION

Therefore, it is an object of this invention to resolve at least one or more of the problems as set forth in the prior art. As a minimum, it is an object of this invention to provide the public with a useful choice.

SUMMARY OF THE INVENTION

Accordingly, this invention provides a method for transmitting and receiving a digital message having N digits, each of said N digits having any one of M values, in a system wherein each of said M values k corresponds with a $k^{th}$-chaotic signal generator having chaotic characteristic value associating with a chaotic algorithm; and is transmitted within a bit period including the steps of:

selecting the corresponding $k^{th}$-chaotic signal generator;

generating a chaotic signal by the corresponding $k^{th}$-chaotic signal generator; and receiving the chaotic signal at a receiver storing the chaotic characteristic values of all of the chaotic signal generators and a demodulating algorithm, and demodulating the chaotic signal to generate the transmitted value k.

Preferably, the chaotic signal is demodulated by the demodulating algorithm by the steps of:

evaluating the chaotic value of the chaotic signal matching the evaluated chaotic value with the stored chaotic characteristic values; and assigning the transmitted value according to the closest match between the evaluated chaotic value and the stored chaotic characteristic values.

Optionally, the chaotic signal includes a series of numbers generated by the chaotic algorithm within the bit period. More preferably, the chaotic signal is generated by the steps of:

a) inputting a random number to the chaotic algorithm to generate a first chaotic number;

b) inputting the first chaotic number to the chaotic algorithm to generate a second chaotic number; and c) repeating step b) using the second chaotic number as the first chaotic number until all numbers to be transmitted within the bit period are generated.

Preferably, the evaluated chaotic value and the stored chaotic characteristic values are matched by the steps of:

d) pairing the first two numbers of the chaotic signal received by the receiver to form a first plot on a two-dimensional plane;

e) repeating step d) for all two consecutive numbers subsequently received by the receiver within the bit period to generate a return map;

f) evaluating the chaotic value of the return map; and g) matching the chaotic value with the stored chaotic values.

Alternatively, wherein M equals to 2, and each digit has a value of either 0 or 1. More preferably, the chaotic algorithm is $y=m[0.5-2|x|]$, x is an input number, m is the chaotic characteristic value, and y is one of the numbers forming the chaotic signal.

It is a second aspect of this invention to provide a method for transmitting the value k in a system for transmitting a digital message having N digits, each of said N digits having any one of M values, and wherein each of said M values k
corresponds with a $k^{th}$-chaotic signal generator having chaotic characteristic value associating with a chaotic algorithm; and
is transmitted within a bit period
including the steps of:
selecting the corresponding $k^{th}$-chaotic signal generator; and
generating a chaotic signal by the corresponding $k^{th}$-chaotic signal generator.

It is a third aspect of this invention to provide a method for receiving the value k in a system for transmitting and receiving a digital message having N digits, each of said N digits having any one of M values, and wherein each of said M values k corresponds with a $k^{th}$-chaotic signal generator having chaotic characteristic value associating with a chaotic algorithm to generate a chaotic signal, said chaotic signal being transmitted within a bit period comprising a series of number generated by the step of:
a) inputting a random number to the chaotic algorithm to generate a first chaotic number;
b) inputting the first chaotic number to the chaotic algorithm to generate a second chaotic number; and
c) repeating step b) using the second chaotic number as the first chaotic number until all numbers to be transmitted within the bit period are generated,
including the step of receiving the chaotic signal at a receiver having a demodulator and storing the chaotic characteristic values of all of the chaotic signal generators, and demodulating the chaotic signal to generate the transmitted value k.

It is a fourth aspect of this invention to provide a system for transmitting and receiving a digital message having N digits, each of said N digits having any one of M values, and wherein each of said M values k is transmitted within a bit period, said system including:
a transmitter having M chaotic signal generators, each of said M chaotic signal generators corresponding to one of the M values k and having a chaotic characteristic value associating with a chaotic algorithm, such that a chaotic signal is generated by a corresponding $k^{th}$-chaotic signal generator when a value k is transmitted; and
a receiver having a demodulator and storing the chaotic characteristic values of all of the chaotic signal generators, to receive and demodulate the chaotic signal to generate the transmitted value.

Preferably, the demodulator further includes a demodulating algorithm to demodulate the chaotic signal by the steps of:
evaluating the chaotic value of the chaotic signal
matching the evaluated chaotic value with the stored chaotic characteristic values; and
assigning the transmitted value according to the closest match between the evaluated chaotic value and the stored chaotic characteristic values.

Optionally, the chaotic signal includes a series of numbers generated by the chaotic algorithm within the bit period. More preferably, the chaotic signal generator generates the chaotic signal by the steps of:
a) inputting a random number to the chaotic algorithm to generate a first chaotic number;
b) inputting the first chaotic number to the chaotic algorithm to generate a second chaotic number; and
c) repeating step b) using the second chaotic number as the first chaotic number until all numbers to be transmitted within the bit period are generated.

Alternatively, the demodulator matches the evaluated chaotic value with the stored chaotic characteristic values by the steps of:
d) pairing the first two numbers of the chaotic signal received by the receiver to form a first plot on a two-dimensional plane;
e) repeating step d) for all two consecutive numbers subsequently received by the receiver within the bit period to generate a return map;
f) evaluating the chaotic value of the return map; and
g) matching the chaotic value with the stored chaotic values.

Preferably, M equals to 2, and each digit has a value of either 0 or 1. More preferably, the chaotic algorithm is $y=m[0.5-2|x|]$, x is an input number, m is the chaotic characteristic value, and y is one of the numbers forming the chaotic signal.

It is a fifth aspect of this invention to provide a transmitter for use in a system for transmitting and receiving a digital message having N digits, each of said N digits having any one of M values, and wherein each of said M values k is transmitted within a bit period, said transmitter having M chaotic signal generators, each of said M chaotic signal generators correspond to one of the M values k and having a chaotic characteristic value associating with a chaotic algorithm, such that a chaotic signal is generated by a corresponding $k^{th}$-chaotic signal generator when a value k is transmitted.

It is a sixth aspect of this invention to provide a receiver for use in a system for transmitting and receiving a digital message having N digits, each of said N digits having any one of M values, and wherein each of said M values k corresponds with a $k^{th}$-chaotic signal generator having chaotic characteristic value associating with a chaotic algorithm to generate a chaotic signal, said chaotic signal being transmitted within a bit period comprising a series of number generated by the step of:
a) inputting a random number to the chaotic algorithm to generate a first chaotic number;
b) inputting the first chaotic number to the chaotic algorithm to generate a second chaotic number; and
c) repeating step b) using the second chaotic number as the first chaotic number until all numbers to be transmitted within the bit period are generated,
wherein said receiver has a demodulator and stores the chaotic characteristic values of all of the chaotic signal generators, to receive and demodulate the chaotic signal to generate the transmitted value.

BRIEF DESCRIPTION OF THE DRAWINGS

Preferred embodiments of the present invention will now be explained by way of example and with reference to the accompanying drawings in which.

DETAILED DESCRIPTION OF THE PREFERRED EMBODIMENT

This invention is now described by way of example with reference to the figures in the following paragraphs. List 1 is a part list so that the reference numerals in the figures may be easily referred to.

Objects, features, and aspects of the present invention are disclosed in or are obvious from the following description. It is to be understood by one of ordinary skill in the art that the present discussion is a description of exemplary embodiments only, and is not intended as limiting the broader aspects of the present invention, which broader aspects are embodied in the exemplary constructions.

A typical digital communication system consists of a transmitter and a receiver. In the transmitter, a modulation process acts upon a given digital message and produces a signal which is transmitted through a channel to a receiver. Usually, the signal transmitted is different from the original message, and is in such a form that is deemed more desirable for transmission.

The present invention is concerned with a modulation/demodulation method that can be used for digital communication. In particular, the transmitted signal is chaotic, which is random-like and occupies a wider bandwidth than would be needed for transmitting the message in the origin form. For example, the present invention can be used in spread-spectrum communication.

The basic form of the present invention will be described, followed by a particular practical embodiment.

Figure 1:
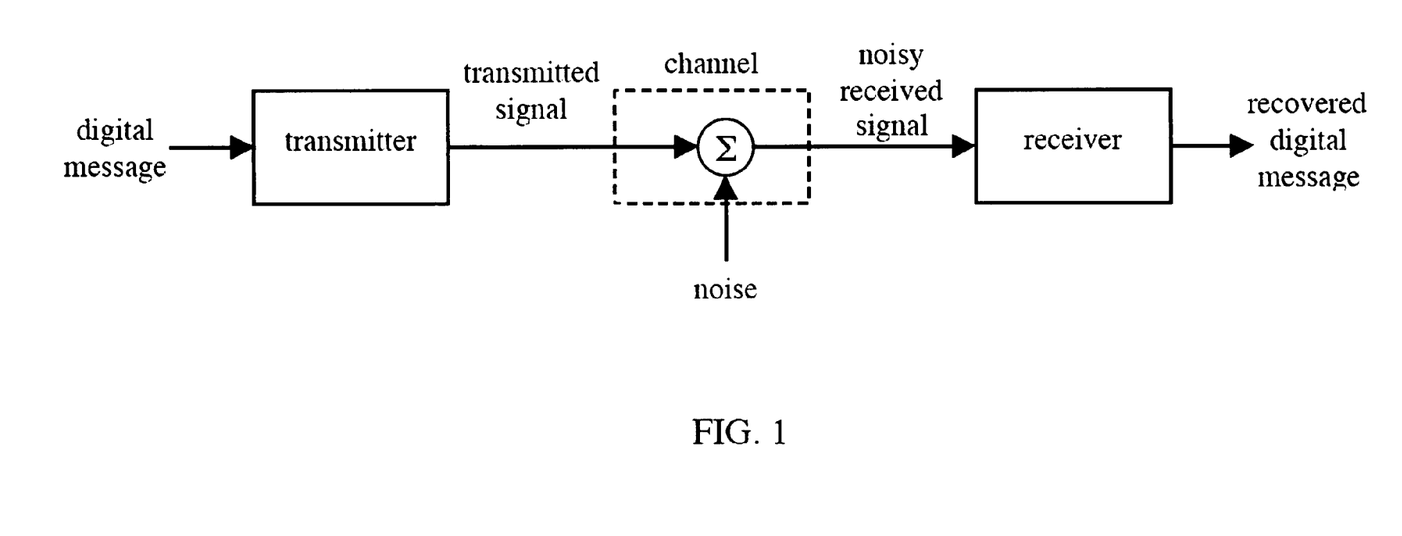
FIG. 1 shows the block diagram of a typical digital communication system.

In its basic form, the apparatus that implements the present invention comprises a transmitter and a receiver, as depicted in FIG. 1. The digital message to be transmitted may have N digits, and each digit having any one of M values. The number N may have no particular limit apart from system limitation, and may be merely an implementation decision. The digital message is generally a sequence of digits. The number M depends on the nature of the system. For example, a binary digital system corresponds to a value of M equal to 2. Generally, each digit may take an M-ary digital value, which is either 0, 1, 2, . . . , or M−1. Of course, this may be merely an illustrative example and other combinations of the M-ary may be applicable to this invention.

Figure 2:
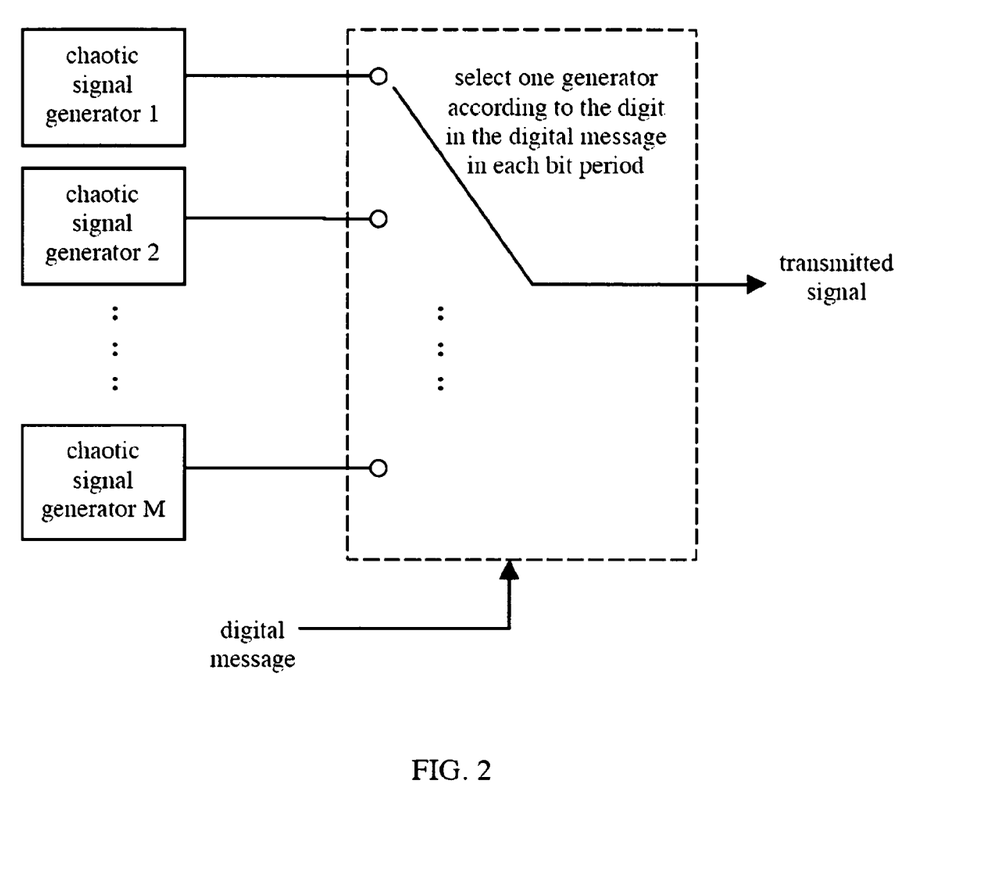
FIG. 2 shows a block diagram of one preferred transmitter of this invention.

A transmitter of this invention is shown in FIG. 2. The transmitter has M chaotic signal generators each corresponds to a value in the M-ary. When a value k is to be transmitted, a $k^{th}$-chaotic signal generator is selected to generate the chaotic signal, preferably comprising a series of numbers. Each value k is transmitted within a bit period.

Each of the chaotic signal generators has a chaotic characteristic value, or a built-in property, and all of the M chaotic characteristic values are associated with a chaotic algorithm. The chaotic characteristic value can be any suitable parameter related to the deterministic generating process of the signal, and can be numerically evaluated to give a characteristic value. Thus, this chaotic characteristic value can be used by the receiver as a signature for identification of the signals generated from the M chaotic signal generators. Suitable examples of the chaotic characteristic values and chaotic algorithm may vary depending on the number M or other implementation factors.

In the transmitter, the modulation process can be described as follows. If a certain digital value k is sent in a bit period, the chaotic signal generated from the corresponding $k^{th}$-chaotic signal generator is transmitted in that bit period. Thus, the transmitter sends segments of chaotic signals. Each segment has a duration equal to a bit period containing a series of numbers. The signal is transmitted through a channel to the receiver. In practice, noise is added to the signal being transmitted. At the receiver, the original digital message has to be recovered from the noisy transmitted signal.

Figure 3:
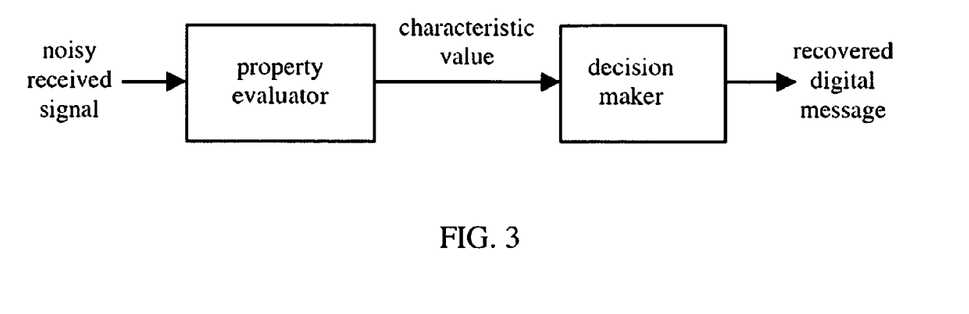
FIG. 3 shows a block diagram of one preferred receiver of this invention.

A receiver of this invention is shown in FIG. 3. The receiver has a decoder and stores the chaotic characteristic values of all of the chaotic signal generators for the demodulation of the received chaotic signals. Of course, the receiver shall have signal receiving capabilities, which would be known to a person skilled in the art, and will not be further described.

The demodulation process can be described as follows. For each bit period, the segment of chaotic signal is obtained and the chaotic characteristic value chosen earlier by the transmitter is evaluated. This evaluated chaotic characteristic value of the received chaotic signal is then matched with the chaotic characteristic values stored at the receiver. Owing to the addition of noise to the transmitted signal, the evaluated chaotic characteristic value does not match exactly with any one of the stored chaotic characteristic values corresponding to the chaotic signal generators in the transmitter. The next step in the demodulation process is therefore to make a decision on which chaotic signal generator has most likely generated that particular chaotic signal segment. This may be accomplished by, for example, first calculating the distance between the evaluated characteristic value and each of the characteristic values of the chaotic signal generators. The digital value corresponding to the chaotic signal chaotic whose characteristic value has the smallest distance from the characteristic value evaluated from the received signal segment is selected as the recovered digital value. Such matching techniques are known and other matching techniques can be utilized as desirable. This process is applied to the signal segment in each bit period, and the original digital message is thus recovered.

Figure 4:
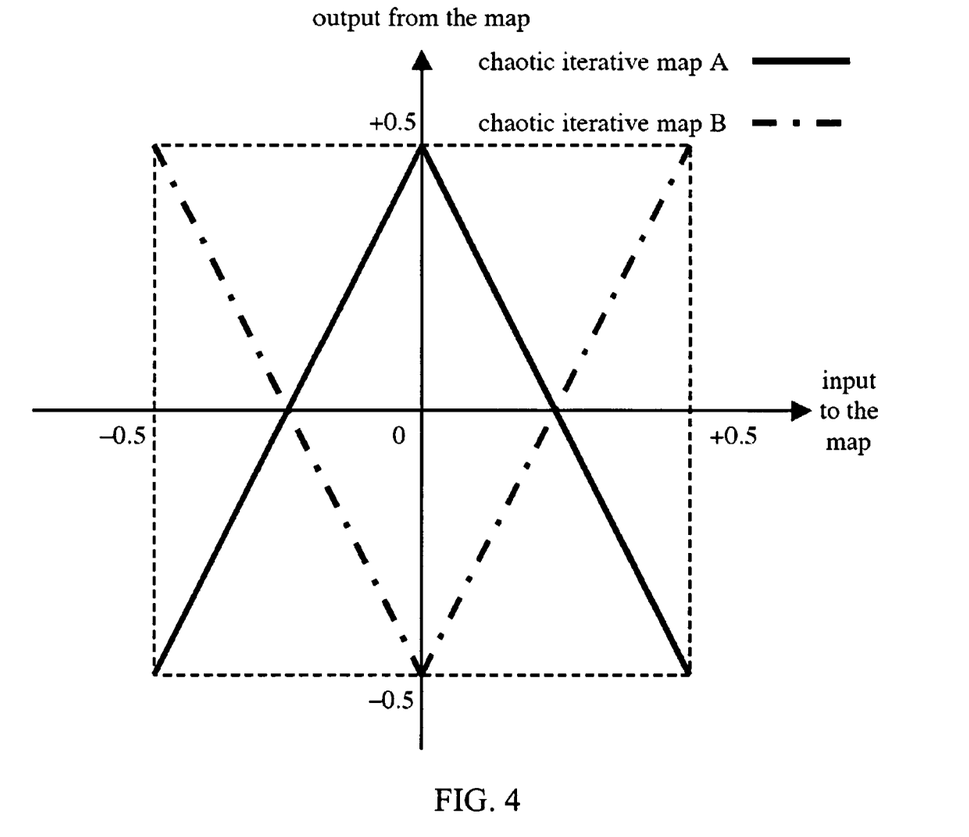
FIG. 4 shows chaotic iterative maps for generating chaotic signals in a preferred embodiment of this invention for transmitting binary digital message.

A particular implementation is described in the following. A binary digital system is implemented, that is, M=2, and the values to be generated are 0 and 1. In the transmitter, two chaotic signal generators are used to generate two chaotic signals accordingly. In the first chaotic signal generator, the generating process is based on an iterative map whose working principle is as follows. The iterative map is generated by the formula $y=m[0.5-2|x|]$, x is an input number, m is the chaotic characteristic value, and y is one of the numbers forming the chaotic signal, where |x| denotes the absolute value of x. The iterative process must begin with an initial number which can be any real number, so that all iterates generated in this way will always lie within a certain range. For example, if the input number is restricted to be −0.5 to +0.5, the output number will always be a value between −0.5 and +0.5. The first resulting number is then treated as an input number, and is acted upon by the iterative map again to generate a second resulting number. The second resulting number is then treated as an input number to generate a third resulting number, and so on. As the iterative process repeats, a sequence of numbers is generated, which is random-like and can be used as the chaotic signal. This process repeats until all numbers to be transmitted within the bit period are generated. These numbers are called iterates. FIG. 4 depicts the two-dimensional plot of this iterative map, relating the input number and the resulting number. This iterative map wherein m=+1 is denoted as chaotic iterative map A in FIG. 4. In the second chaotic signal generator, a different iterative map is employed where m=−1. This second iterative map, denoted as chaotic iterative map B in FIG. 4. The two-dimensional plot of this second iterative map is also depicted in FIG. 4. It is clear that these two iterative maps share the same algebraic form, which is $y=m[0.5-2|x|]$, the chaotic algorithm, where m equals +1 for chaotic iterative map A, and −1 for chaotic iterative map B. The parameter m can be regarded as a property of the iterative map, which is fixed once the iterative map is chosen. The value of this parameter is called the chaotic characteristic value. Thus, the characteristic value of chaotic iterative map A is +1, and the characteristic value of chaotic iterative map B is −1.

Chaotic algorithms other than $y=m[0.5-2|x|]$ can be used. Generally a set of iterative maps may be in the form $f(x, m)$, where x is the variable or the input number, and m is the chaotic characteristic value. Suitable examples of $f(x, m)$ may be the skewed tent map, the quadratic map and the cubic map. The exact form of the map to be used depends on the range of the chaotic numbers to be chosen for a particular application. The choice of the range of the chaotic numbers can be made arbitrarily initially since scaling can be applied later to re-define the range before the signal is transmitted.

According to the above example for transmitting a digital message comprising digits of binary values, a digital message is modulated in the transmitter as follows. If the digit to be sent in a bit period is 0, for example, the chaotic signal generated from chaotic iterative map A is to be transmitted. Moreover, if the digit to be sent in a bit period is 1, the chaotic signal generated from chaotic iterative map B is to be transmitted. The transmitted signal therefore consists of segments of chaotic signals. In each segment, the chaotic signal is generated from either chaotic iterative map A or chaotic iterative map B, depending upon the value of the digit to be sent. If each segment contains Q iterates generated from the iterative map, then the spreading factor is Q.

Figure 5:
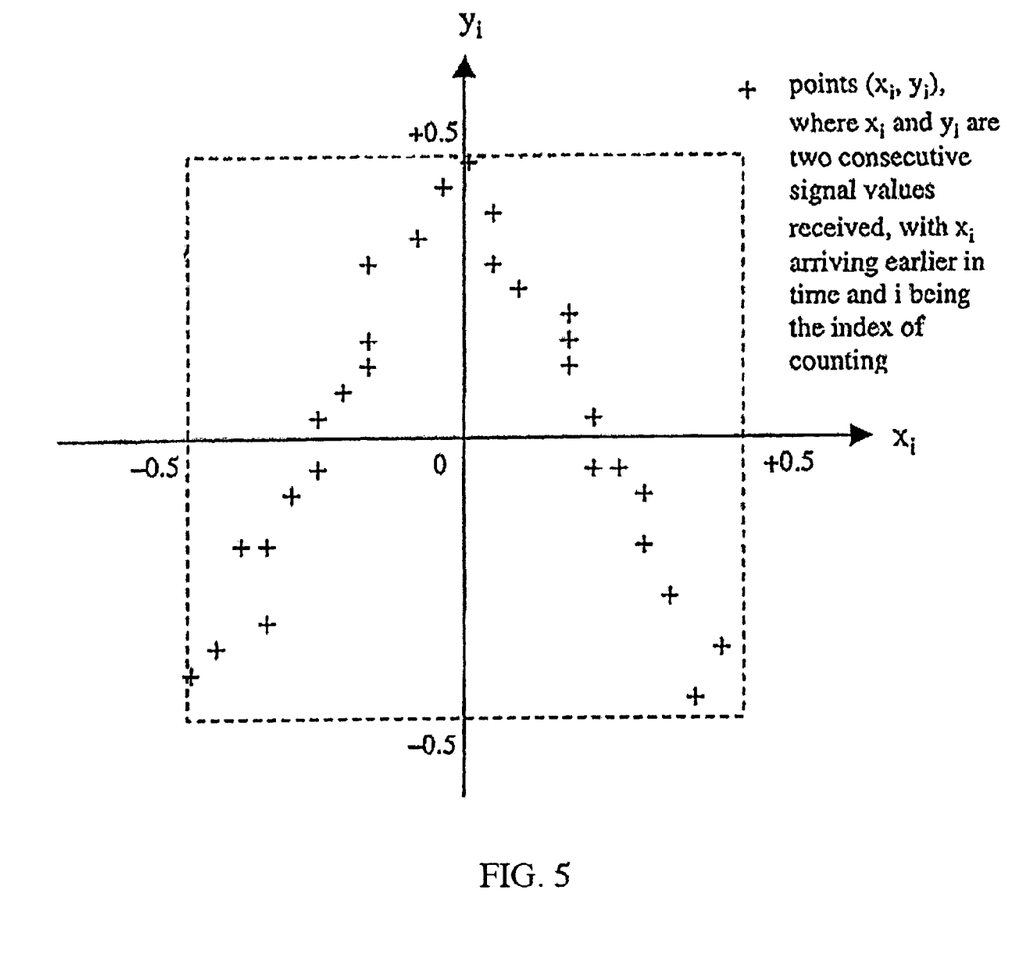
FIG. 5 shows a noisy return map reconstructed from the received signal in the preferred embodiment of FIG. 4.

The signal is transmitted through a channel to the receiver. In practice, the channel adds noise to the signal. The signal arriving at the receiver is therefore contaminated by additive noise, and is different from the originally transmitted signal. The receiver's function is to recover the original digital message from the noisy received signal. In the receiver, the first step in the demodulation process is to reconstruct the iterative map. The reconstruction procedure can be accomplished by pairing all two consecutive values of the received signal as points which are then plotted on a two-dimensional plane. For example, if the received signal is 0.12, 0.31, −0.11, 0.27, −0.05, . . . , then the points to be plotted are (0.12, 0.31), (0.31, −0.11), (0.11, 0.27), (0.27, −0.05), . . . . The resulting plot is called a return map, which should have a similar appearance as the generating iterative map. The deviation of the return map from the generating iterative map is due to the added noise. In general, the higher the noise level, the more significant is the deviation of the return map from the generating iterative map. FIG. 5 shows a typical return map.

After the return map is constructed for a particular bit period, the demodulation process continues. The next step is to evaluate the characteristic value of the return map. One possible way is to fit the points on the return map to either of the iterative maps, i.e., $y=m[0.5-2|x|]$. In this particular implementation, a standard least-mean-square regression algorithm is used to find the value of m that gives the best fit. This fitting algorithm essentially finds the value of m that gives the smallest sum of the mean-square distances of all the points on the return map from the function $y=m[0.5-2|x|]$. Suppose the points on the return map are $(x_1, y_1), (x_2, y_2)$, etc., or simply $(x_i, y_i)$, where i is the index for counting the points, as depicted in FIG. 5. Clearly, the largest value of i is the number of points on the return map, which depends on the spreading factor. One standard formula for finding m is $[S1 \div S2]$ where S1 is the summation of $y_i \times m \times [0.5-2|x_i|]$ over all i, and S2 is the summation of the squares of $\{m \times [0.5-2|x_i|]\}$ over all i. (Theory of curve fitting by regression can be found in the book "Regression Analysis: Statistical Modeling of a Response Variable" by Freund R. J., et al., Academic Press, 1998.). The above matching technique is known and of course other suitable matching methods can be used. Note that the chaotic algorithm is not required to be stored in the receiver of this invention.

Figure 6:
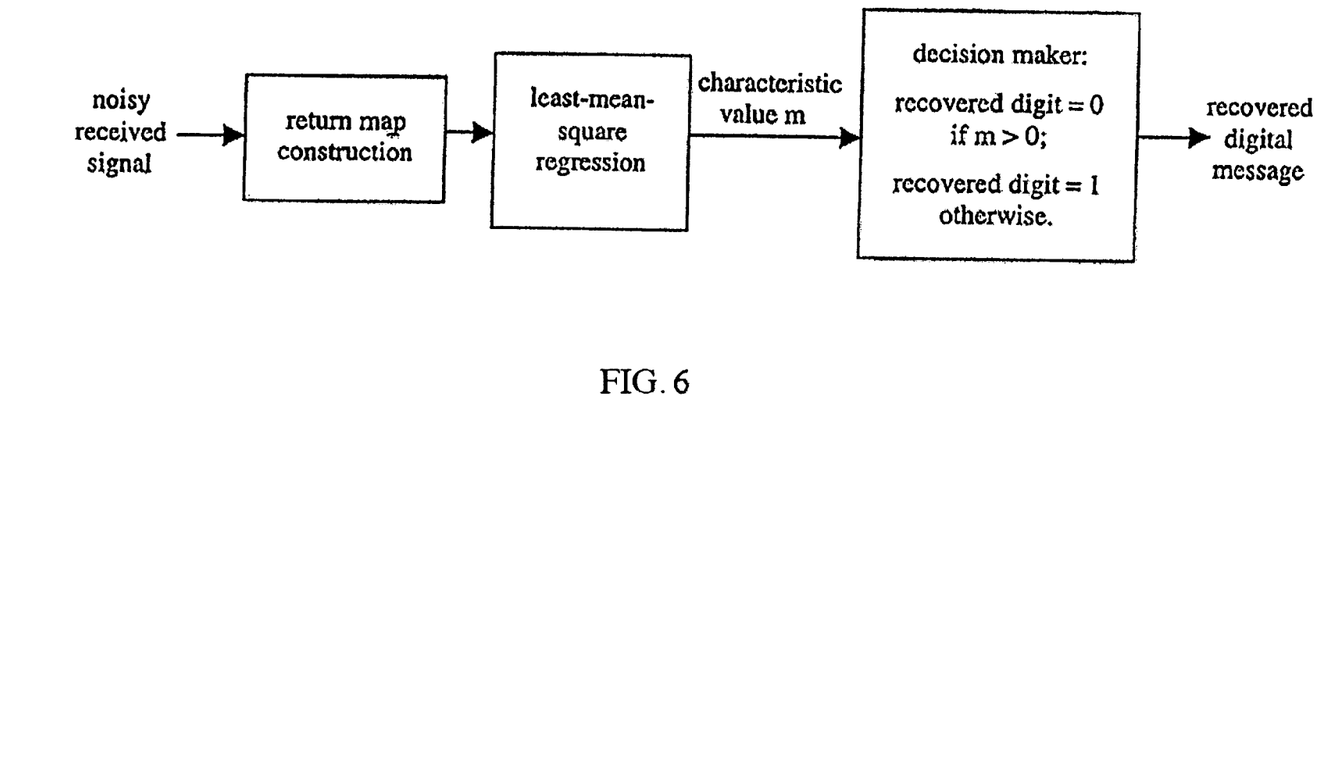
FIG. 6 shows a block diagram of the receiver in the preferred embodiment of FIG. 4.

After the characteristic value is found for the received signal segment in a bit period, a decision has to be made regarding the identity of the digit being received. In the above example, since digit 0 corresponds to a value of m equal to +1, and digit 1 corresponds to a value of m equal to −1, the decision algorithm is as simple as checking the sign of the characteristic value found for the received signal segment. Specifically, if the characteristic value found for the received signal segment is positive; the digit is recovered as 0. Otherwise, the digit is recovered as 1. The demodulation process as described above is repeatedly applied to the signal segments of all bit periods. Thus, for each bit period, a digit can be recovered. In brief, the demodulation process consists of a return map construction, a regression algorithm and a decision-making algorithm, as depicted in FIG. 6.

Computer simulations have been performed to evaluate the modulation/demodulation method. The bit error rates (BER) are evaluated for different noise levels, as has been customarily used in telecommunications. The appropriate measure for noise levels in digital communication systems is the bit-energy-to-noise-spectral-density ratio, which is commonly denoted as Eb/No. Its unit is the decibel. It has been found that with a spreading factor of 10, the simulated bit error rates are as listed below:

| | | |
|---|---|---|
| BER = 0.1 | for | Eb/No equal to 10.3 dB; |
| BER = 0.01 | for | Eb/No equal to 13.8 dB; |
| BER = 0.001 | for | Eb/No equal to 16.1 dB; |
| BER = 0.0001 | for | Eb/No equal to 17.2 dB; |
| BER = 0.00001 | for | Eb/No equal to 17.6 dB. |

This invention basically exploits some suitable built-in properties of chaotic signals for demodulation. Since the generation of synchronized chaotic carrying signals is not required in the receiver, the invention can be practically used in digital communication systems. Furthermore, the modulation does not rely on any specific bit structure, and therefore the message may not be recovered easily by an unintended receiver comparing with using specific bit structure. Also, since the bit energy level is the same for all digital values, unintended detection based on identifying the bit energy levels become impossible. This invention therefore may provide a practical way to send digital messages using chaotic signals on the one hand, and offers a basic level of resistance to detection by unintended receivers on the other.

While the preferred embodiment of the present invention has been described in detail by the examples, it is apparent that modifications and adaptations of the present invention will occur to those skilled in the art. Furthermore, the embodiments of the present invention shall not be interpreted to be restricted by the examples or figures only. It is to be expressly understood, however, that such modifications and adaptations are within the scope of the present invention, as set forth in the following claims. For instance, features illustrated or described as part of one embodiment can be used on another embodiment to yield a still further embodiment. Thus, it is intended that the present invention cover such modifications and variations as come within the scope of the claims and their equivalents.

The invention claimed is:

1. A method for receiving a digital message transmitted from a transmitter, the message having N digits, each of the N digits having any one of M values, and wherein each of the M values k corresponds with a $k^{th}$-chaotic signal generator having a chaotic characteristic value associated with a chaotic algorithm to generate a chaotic signal, the chaotic signal having been transmitted within a bit period and comprising a series of numbers generated by:
   inputting a random number to the chaotic algorithm to generate a first chaotic number;
   inputting the first chaotic number to the chaotic algorithm to generate a second chaotic number; and
   repeating said inputting the first chaotic number to the chaotic algorithm to generate a second chaotic number, using the second chaotic number as the first chaotic number until all numbers to be transmitted within the bit period are generated,
   the method for receiving a digital message comprising:
      receiving the chaotic signal at a receiver storing the chaotic characteristic values of all chaotic signal generators used to transmit the message; and
      demodulating the chaotic signal to generate the transmitted value k, said demodulating the chaotic signal including:
   the chaotic characteristic value of the received chaotic signal based at least in part on the chaotic algorithm;
   matching the determined chaotic characteristic value of the received chaotic signal with the chaotic characteristic values stored in the receiver; and
   assigning the transmitted value k by reference to the closest match between the determined chaotic characteristic value and the stored chaotic characteristics values.

2. The method of claim 1, wherein said determining the chaotic characteristic value of the received chaotic signal based at least in part on the chaotic algorithm includes:
   pairing every two consecutive chaotic numbers received within the bit period to generate a return map of the chaotic signal; and
   determining the chaotic value of the return map based at least on the chaotic algorithm.

3. The method of claim 1, wherein M equals to 2, and each digit has a value of either 0 or 1.

4. The method of claim 3, wherein the chaotic algorithm is $y=m[0.5-2|x|]$, x is an input number, m is the chaotic characteristic value, and y is one of the numbers forming the chaotic signal.

5. A receiver for use in a system for transmitting and receiving a digital message having N digits, each of said N digits having any one of M values, and wherein each of the M values k corresponds with a $k^{th}$-chaotic signal generator having chaotic characteristic value associated with a chaotic algorithm to generate a chaotic signal, the chaotic signal having been transmitted within a bit period comprising a series of numbers generated by:
   inputting a random number to the chaotic algorithm to generate a first chaotic number;
   inputting the first chaotic number to the chaotic algorithm to generate a second chaotic number; and
   repeating said inputting the first chaotic number to the chaotic algorithm to generate a second chaotic number, using the second chaotic number as the first chaotic number until all numbers to be transmitted within the bit period are generated,
   wherein the receiver comprises a demodulator and is configured to store the chaotic characteristic values of all of the chaotic signal generators used to transmit the message, and configured to receive and demodulate the chaotic signal to generate the transmitted value, wherein to demodulate the received chaotic signal, the receiver is configured to:
   determine the chaotic characteristic value of the received chaotic signal based at least in part on the chaotic algorithm;
   match the determined chaotic characteristic value of the received chaotic signal with the chaotic characteristic values stored in the receiver; and
   assign the transmitted value k by reference to the closest match between the determined chaotic characteristic value and the stored chaotic characteristics values.

6. The receiver of claim 5, wherein to determine the evaluated chaotic value of the chaotic signal based at least in part on the chaotic algorithm, the receiver is configured to:
   pair every two consecutive chaotic numbers received within the bit period to generate a return map of the chaotic signal; and
   determine the chaotic value of the return map based at least in part on the chaotic algorithm.

7. The receiver of claim 5, wherein M equals to 2, and each digit has a value of either 0 or 1.

8. The receiver of claim 7, wherein the chaotic algorithm is $y=m[0.5-2|x|]$, x is an input number, m is the chaotic characteristic value, and y is one of the numbers forming the chaotic signal.

9. A method for receiving from a transmitter a digital message having N digits, wherein each of the N digits has any one of M values, and wherein each of the M values corresponds to one of M chaotic signal generators for the transmitter, the method comprising:
   receiving, by a receiver, a chaotic signal from the transmitter; and
   evaluating, by the receiver, the chaotic signal to determine which one of the M values the chaotic signal conveys;
   wherein said evaluating includes determining, by the receiver, which one of the M chaotic signal generators of the transmitter generated the chaotic signal;
   wherein said determining which one of the M chaotic signal generators generated the chaotic signal includes determining, by the receiver, a chaotic characteristic value for the chaotic signal and comparing the determined chaotic characteristic value to a plurality of chaotic characteristic values stored on the receiver and correspondingly associated with the M chaotic signal generators; and
   wherein said determining a chaotic characteristic value for the chaotic signal is based, at least in part, on a chaotic algorithm associated with the M chaotic signal generators known to the receiver, and wherein each of the M chaotic signal generators is associated with the chaotic algorithm and has a different chaotic characteristic value.

10. The method of claim 9, wherein said determining a chaotic characteristic value for the chaotic signal is based, at least in part, on a chaotic algorithm associated with the M chaotic signal generators known to the receiver comprises:
    constructing, by the receiver, a return map having a plurality of points and using successive pairs of numbers from the chaotic signal; and
    fitting, by the receiver, points on the return map to the chaotic algorithm to generate the chaotic characteristic value for the chaotic signal.

11. The method of claim 9, wherein M equals 2, wherein each of the N digits has a value of either 0 or 1, and wherein the chaotic signal comprises a series of numbers transmitted within a bit period.

12. The method of claim 11, wherein the chaotic algorithm is y=m[0.5−2|x|], where x is an input number, m is the chaotic characteristic value, and y is one of the numbers within the bit period forming the chaotic signal.

13. A receiver for receiving from a transmitter a digital message having N digits, wherein each of the N digits has any one of M values, and wherein each of the M values corresponds to one of M chaotic signal generators for the transmitter, the receiver comprising:

a demodulator configured to evaluate a chaotic signal received from the transmitter to determine which one of the M values the chaotic signal conveys;

wherein the evaluation includes determining which one of the M chaotic signal generators for the transmitter generated the chaotic signal;

wherein said determining which one of the M chaotic signal generators generated the chaotic signal includes determining a chaotic characteristic value for the chaotic signal and comparing the determined chaotic characteristic value to a plurality of chaotic characteristic values stored on the receiver and correspondingly associated with the M chaotic generators; and wherein said determining a chaotic characteristic value for the chaotic signal is based, at least in part, on a chaotic algorithm associated with the M chaotic signal generators known to the receiver, and wherein each of the M chaotic signal generators is associated with the chaotic algorithm and has a different chaotic characteristic value.

14. The receiver of claim 13, wherein the receiver is configured to determine the chaotic characteristic value for the chaotic signal based, at least in part, on a chaotic algorithm associated with the M chaotic signal generators known to the receiver by:

constructing a return map having a plurality of points and using successive pairs of numbers from the chaotic signal; and fitting points on the return map to the chaotic algorithm to generate the chaotic characteristic value for the chaotic signal.

15. The receiver of claim 13, wherein M equals 2, and wherein each of the N digits has a value of either 0 or 1.

16. The receiver of claim 15, wherein the chaotic algorithm is y=m[0.5−2|x|], where x is an input number, m is the chaotic characteristic value, and y is one of the numbers within the bit period forming the chaotic signal.

* * * * *

UNITED STATES PATENT AND TRADEMARK OFFICE
CERTIFICATE OF CORRECTION

PATENT NO. : 7,711,116 B2 Page 1 of 1
APPLICATION NO. : 10/614260
DATED : May 4, 2010
INVENTOR(S) : Chung-Ming Lau and Chi-Kong Tse It is certified that error appears in the above-identified patent and that said Letters Patent is hereby corrected as shown below:

In the Claims:

In column 9, line 29 claim 1, "the chaotic characteristic" should read --determining the chaotic characteristic--.

Signed and Sealed this

Twenty-first Day of September, 2010

David J. Kappos
*Director of the United States Patent and Trademark Office*